(12) United States Patent
Karaki

(10) Patent No.: US 12,314,026 B2
(45) Date of Patent: May 27, 2025

(54) INFORMATION PROCESSING DEVICE, CONTROL DEVICE, AND OPTIMIZATION METHOD

(71) Applicant: FANUC CORPORATION, Yamanashi (JP)

(72) Inventor: Shunsuke Karaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 427 days.

(21) Appl. No.: 17/928,406

(22) PCT Filed: Jun. 10, 2021

(86) PCT No.: PCT/JP2021/022075
§ 371 (c)(1),
(2) Date: Nov. 29, 2022

(87) PCT Pub. No.: WO2021/256364
PCT Pub. Date: Dec. 23, 2021

(65) Prior Publication Data
US 2023/0205167 A1    Jun. 29, 2023

(30) Foreign Application Priority Data
Jun. 17, 2020 (JP) .................................. 2020-104430

(51) Int. Cl.
*G05B 19/404* (2006.01)

(52) U.S. Cl.
CPC .. *G05B 19/404* (2013.01); *G05B 2219/49219* (2013.01)

(58) Field of Classification Search
None
See application file for complete search history.

(56) References Cited

U.S. PATENT DOCUMENTS

2018/0275629 A1* 9/2018 Watanabe .............. G01K 13/00

FOREIGN PATENT DOCUMENTS

| JP | 2003-094291 | 4/2003 |
| JP | 2018-111145 | 7/2018 |

(Continued)

OTHER PUBLICATIONS

International Search Report issued Aug. 31, 2021, in International (PCT) Application No. PCT/JP2021/022075, with English translation.

*Primary Examiner* — Ryan A Jarrett
(74) *Attorney, Agent, or Firm* — Wenderoth, Lind & Ponack, L.L.P.

(57) ABSTRACT

An information processing device includes a parameter selection method determination unit that selects a hyperparameter of a thermal displacement amount prediction formula as a first hyperparameter, a parameter selection unit that sets/changes the value of the first hyperparameter and fixes remaining hyperparameter values as second hyperparameter values, a machine learning unit that generates a thermal displacement amount prediction formula for each value of the first hyperparameter based on thermal displacement teacher data, and a model evaluation unit that stores the first hyperparameter values together with evaluation values which are the difference between the thermal displacement amounts estimated by each thermal displacement amount prediction formula and measured thermal displacement amounts. The parameter selection method determination unit uses a history of the values of the first hyperparameter and the evaluation values to set the value of the first hyperparameter when the evaluation value is smallest as an optimal value.

6 Claims, 8 Drawing Sheets

(56) References Cited

FOREIGN PATENT DOCUMENTS

| | | |
|---|---|---|
| JP | 2018-153901 | 10/2018 |
| JP | 2018-153902 | 10/2018 |

\* cited by examiner

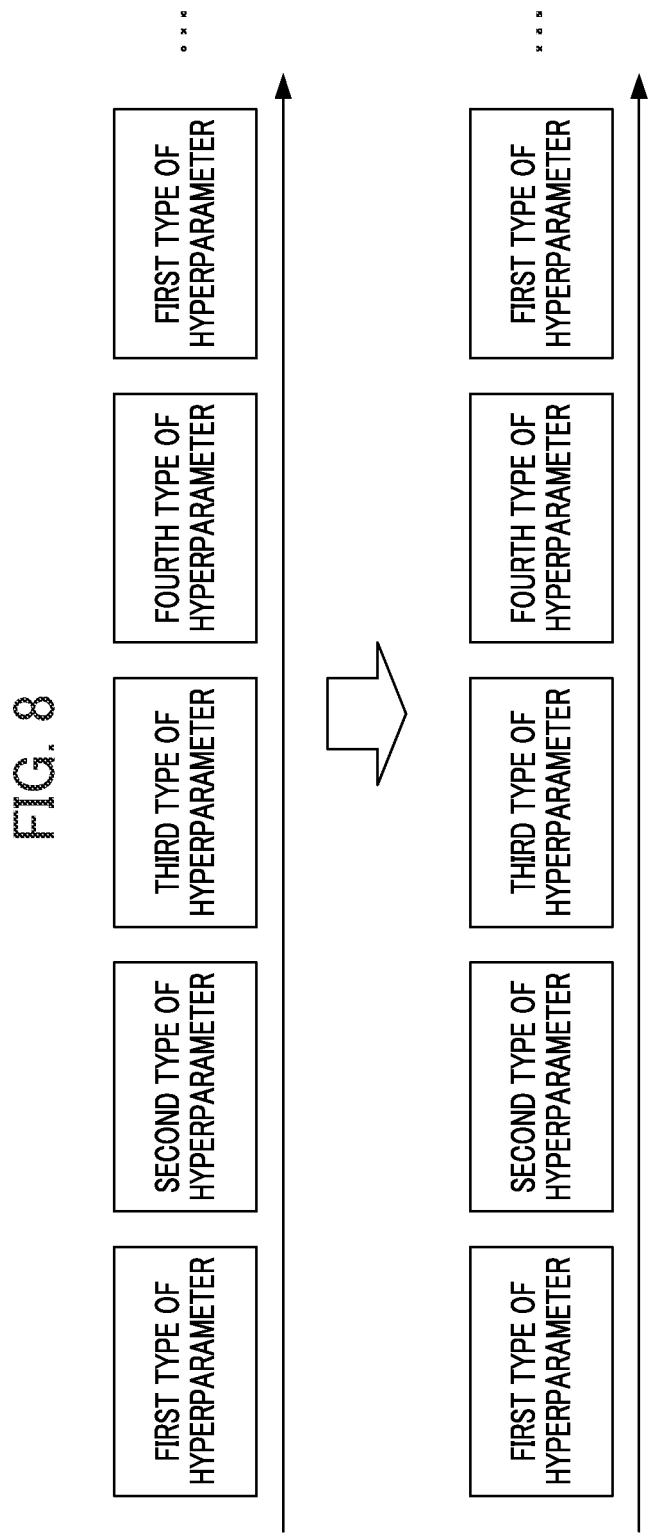

INFORMATION PROCESSING DEVICE, CONTROL DEVICE, AND OPTIMIZATION METHOD

TECHNICAL FIELD

The present invention pertains to an information processing device, a control device, and an optimization method.

BACKGROUND ART

As one main factor for a machining error in a machine tool, there is the problem that relative thermal displacement occurs between a tool and a workpiece due to thermal expansion by a mechanical element in the machine tool. More specifically, for example, a main shaft, a main-shaft device, a bed, a column, a work table, a tool, etc. can be given as components in a machine tool. There are cases where, due to heat generation in accordance with rotation by the main shaft, heat generation by a main-shaft drive motor, heat absorption by coolant supplied from a coolant supply device to a tool, heat absorption by lubricating oil supplied from a lubricating oil supply device to a main-shaft bearing, etc. the abovementioned components—in particular mainly the main shaft—thermally deform, and relative thermal displacement occurs between the tool and the workpiece.

Regarding this point, there is known a technique that repeats: a process for using machine learning to set a coefficient pertaining to a time delay element while, based on a difference between an estimated value for an amount of thermal displacement of a mechanical element calculated using a thermal displacement amount prediction formula for estimating the amount of thermal displacement of the mechanical element and an actual measurement value for an amount of thermal displacement of the mechanical element, fixing to a predetermined value a coefficient in the thermal displacement amount prediction formula that pertains to measurement data and is not the coefficient pertaining to the time delay element; and a process for, based on the difference, using machine learning to set the coefficient pertaining to the measurement data while fixing the coefficient pertaining to the time delay element to a predetermined value, whereby a high-accuracy compensation formula is derived with a small calculation amount and high-accuracy compensation is performed based on the compensation formula. For example, refer to Patent Document 1.

Patent Document 1: Japanese Unexamined Patent Application, Publication No. 2018-153902

DISCLOSURE OF THE INVENTION

Problems to be Solved by the Invention

Patent Document 1 discloses calculating an optimal thermal displacement amount prediction formula (hereinafter, may be referred to as a "thermal displacement model") under preset conditions (for example, as described below, condition parameters such as a number of temperature sensors disposed in a machine tool, disposed positions for the temperature sensors, a sampling time for a time of temperature measurement by the temperature sensors, and how far to go back in the past for a time delay are preset) by performing machine learning on the coefficient pertaining to the time delay element and the coefficient pertaining to the measurement data in the thermal displacement amount prediction formula under the preset conditions, while employing as teacher data a set of temperature data measured by the temperature sensors and measurement value data for an amount of thermal displacement at a time of temperature measurement.

Such preset condition parameters (for example, parameters such as a number of temperature sensors disposed in a machine tool, disposed positions for the temperature sensors, a sampling time for a time of temperature measurement by the temperature sensors, and how far to trace back in the past for a time delay) may be referred to below as hyperparameters (design variables).

In other words, it can be said that an optimal thermal displacement amount prediction formula (thermal displacement model) is calculated for each hyperparameter value.

However, there are many (more or less close to infinite) combinations of these hyperparameters (design variables), and it is unrealistic to try all combinations, calculate an optimal thermal displacement amount prediction formula (thermal displacement model) for each hyperparameter value, and further acquire an even more optimal thermal displacement amount prediction formula (thermal displacement model) from a set of each optimal thermal displacement amount prediction formula (thermal displacement model) for a respective hyperparameter value. For example, even if it is assumed that a method is taken in which a user determines hyperparameter values by performing trial-and-error, such as by testing a good-seeming combination with trial and error and testing the next combination with a combination that went well as a foundation, it is difficult to uniquely determine hyperparameter values. In addition, generating a practical thermal displacement amount prediction formula (thermal displacement model) is estimated to take an enormous amount of time (for example, one week or more) for trial and error relating to a combination of hyperparameters.

Accordingly, automatically optimizing values for hyperparameters in a thermal displacement amount prediction formula (thermal displacement model) is desired.

Means for Solving the Problems (1) One aspect of an information processing device according to the present disclosure, when generating a thermal displacement amount prediction formula by performing machine learning for, based on a measurement data group including temperature data regarding a mechanical element that undergoes thermal expansion and is in a machine tool and regarding a periphery of the mechanical element and/or operating state data regarding the mechanical element, estimating an amount of thermal displacement of the mechanical element, optimizes values for a plurality of hyperparameters included in the thermal displacement amount prediction formula, the information processing device including: a measurement data acquisition unit configured to acquire the measurement data group; a thermal displacement amount acquisition unit configured to acquire an actual measurement value for an amount of thermal displacement of the mechanical element; a storage unit configured to set the measurement data group acquired by the measurement data acquisition unit as input data, set the actual measurement value for the amount of thermal displacement of the mechanical element acquired by the thermal displacement amount acquisition unit as a label, and store the input data and the label associated with each other as teacher data; a parameter selection method determination unit configured to select, as a first hyperparameter, at least one hyperparameter to be optimized from among the plurality of hyperparameters; a parameter selection unit configured to set/change a value for the first hyperparameter, set a hyperparameter that was not selected by the parameter selection method determination unit as a second hyperparameter, and fix a value for the second hyperparameter; a machine learning unit configured to, by performing machine learning based on the measurement data group and the actual measurement value for the amount of thermal displacement of the mechanical element for each combination of the value for the first hyperparameter and the value for the second hyperparameter, generate the thermal displacement amount prediction formula for each set/changed value for the first hyperparameter while setting the value for the second hyperparameter to a fixed value; and a model evaluation unit configured to calculate, as an evaluation value, an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and store the calculated evaluation value in the storage unit in association with the value for the first hyperparameter while setting the value for the second hyperparameter to the fixed value, in which the parameter selection method determination unit, based on a history for the value for the first hyperparameter and the evaluation value that are stored in the storage unit, sets the value for the first hyperparameter at a time when the evaluation value is a minimum to an optimal value while setting the value for the second hyperparameter to the fixed value.

(2) One aspect of a control device according to the present disclosure is provided with the information processing device according to (1).

(3) One aspect of an optimization method according to the present disclosure is realized by a computer and is for, when generate a thermal displacement amount prediction formula by performing machine learning for, based on a measurement data group including temperature data regarding a mechanical element that undergoes thermal expansion and is in a machine tool and regarding a periphery of the mechanical element and/or operating state data regarding the mechanical element, estimating an amount of thermal displacement of the mechanical element, optimizing values for a plurality of hyperparameters included in the thermal displacement amount prediction formula, the optimization method including: a measurement data acquisition step for acquiring the measurement data group; a thermal displacement amount acquisition step for acquiring an actual measurement value for an amount of thermal displacement of the mechanical element; a storage step for setting the measurement data group acquired in the measurement data acquisition step as input data, setting the actual measurement value for the amount of thermal displacement of the mechanical element acquired in the thermal displacement amount acquisition step as a label, and storing the input data and the label associated with each other as teacher data in a storage unit; a parameter selection method determination step for selecting, as a first hyperparameter, at least one hyperparameter to be optimized from among the plurality of hyperparameters; a parameter selection step for setting/changing a value for the first hyperparameter, setting a hyperparameter that was not selected in the parameter selection method determination step as a second hyperparameter, and fixing a value for the second hyperparameter; a machine learning step for, by performing machine learning based on the measurement data group and the actual measurement value for the amount of thermal displacement of the mechanical element for each combination of the value for the first hyperparameter and the value for the second hyperparameter, generating the thermal displacement amount prediction formula for each set/changed value for the first hyperparameter while setting the value for the second hyperparameter to a fixed value; and a model evaluation step for calculating an evaluation value that indicates an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and storing the calculated evaluation value in the storage unit in association with the value for the first hyperparameter while setting the value for the second hyperparameter to the fixed value, in which, in the parameter selection method determination step, based on a history for the value for the first hyperparameter and the evaluation value that are stored in the storage unit, the value for the first hyperparameter at a time when the evaluation value is a minimum is set to an optimal value while the value for the second hyperparameter is set to the fixed value.

Effects of the Invention

Accordingly, by virtue of one aspect, it is possible to automatically optimize values for hyperparameters in a thermal displacement amount prediction formula (thermal displacement model).

BRIEF DESCRIPTION OF THE DRAWINGS

FIG. 8 is a view that illustrates an example of orders for optimization processes for four types of hyperparameters.

PREFERRED MODE FOR CARRYING OUT THE INVENTION

One Embodiment

Figure 1:
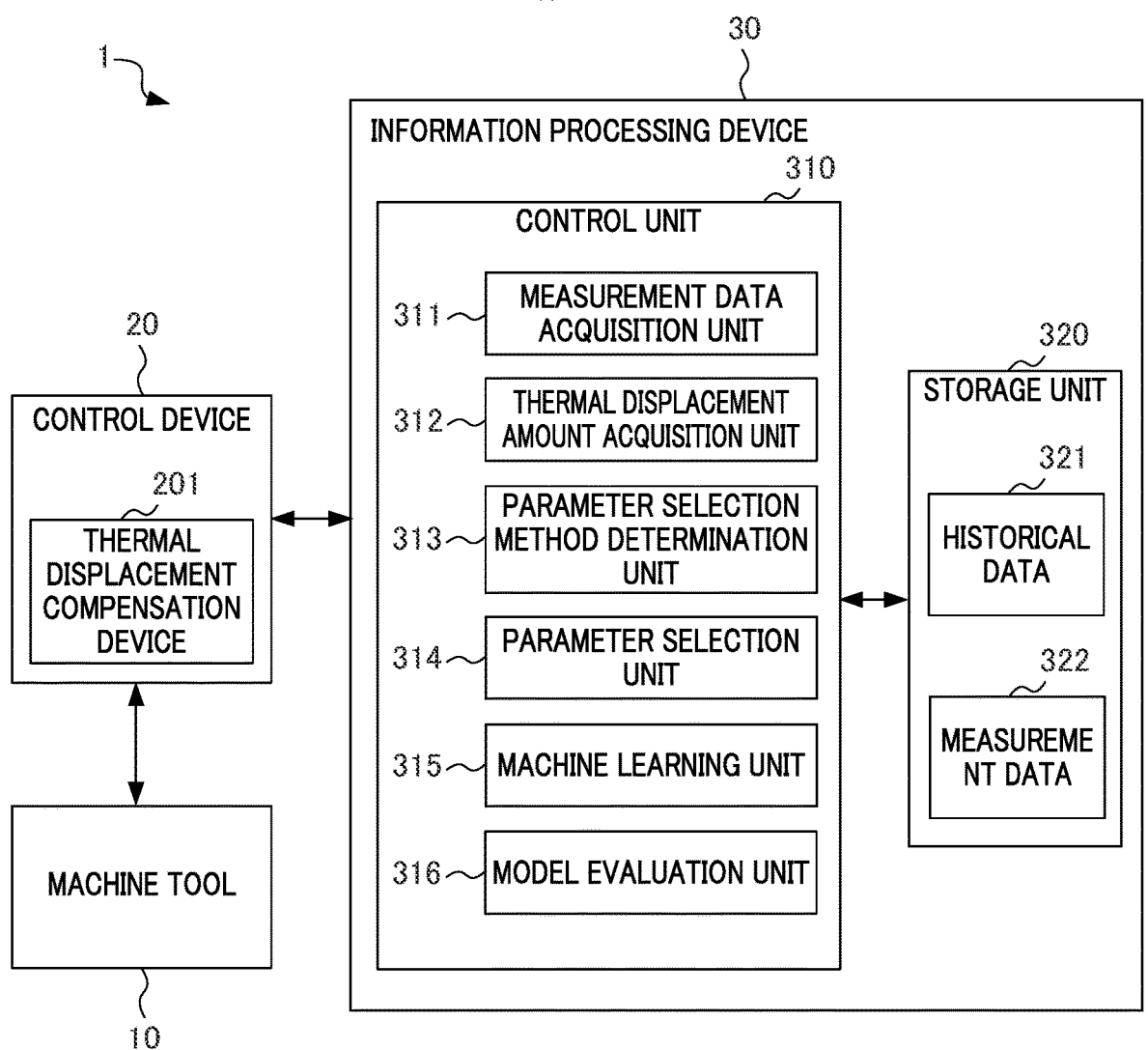
FIG. 1 is a functional block diagram illustrating an example of a functional configuration of an information processing system according to one embodiment.

Firstly, an outline of the present embodiment is described. In the present embodiment, an information processing device selects, as a first hyperparameter, at least one hyperparameter to be optimized from among a plurality of hyperparameters which are to be premises for when calculating a thermal displacement amount prediction formula (thermal displacement model) for estimating an amount of thermal displacement for a mechanical element in a machine tool. The information processing device calculates an optimal thermal displacement amount prediction formula (thermal displacement model) by setting/changing a value for the first hyperparameter, employing as a second hyperparameter another hyperparameter that was not selected, making a value for the second hyperparameter be a fixed value, and for each value of the first hyperparameter that is set or changed, performing machine learning, for example as described above, on the coefficient pertaining to the time delay element and the coefficient pertaining to the measurement data in the thermal displacement amount prediction formula (thermal displacement model), while employing as teacher data a set of temperature data measured by the temperature sensors and measurement value data for an amount of thermal displacement at a time of temperature measurement.

The information processing device stores, in association with the value for the first hyperparameter, an evaluation value calculated by a later-described model evaluation unit with respect to the optimal thermal displacement amount prediction formula (thermal displacement model) calculated for each value for the first hyperparameter that was set or changed. As a result, based on a history for the stored value for a first hyperparameter and the evaluation value for the optimal thermal displacement amount prediction formula (thermal displacement model) calculated for each value for the first hyperparameter, in a case where another hyperparameter that was not selected is employed as a second hyperparameter, a value for the second hyperparameter is made to be a fixed value, and the value for the first hyperparameter is set or changed, the information processing device can, while employing as a second hyperparameter another hyperparameter that was not selected, make a value for the first hyperparameter, for a time when the evaluation value is a minimum for the optimal thermal displacement amount prediction formula (thermal displacement model) calculated for each value for the first hyperparameter that was set or changed, be an optimal value for the first hyperparameter ("first-time optimal first hyperparameter value") when the value for the second hyperparameter is the fixed value.

Next, after setting the value for the first parameter to the first-time optimal first hyperparameter value, an optimal thermal displacement amount prediction formula (thermal displacement model) is calculated by setting/changing the value for the second hyperparameter, and for each value of the second hyperparameter that is set or changed, performing machine learning, for example as described above, on the coefficient pertaining to the time delay element and the coefficient pertaining to the measurement data in the thermal displacement amount prediction formula (thermal displacement model), while employing as teacher data a set of temperature data measured by the temperature sensors and measurement value data for an amount of thermal displacement at a time of temperature measurement.

Similarly to the process described above, the information processing device stores, in association with the value for the second hyperparameter, an evaluation value calculated by a later-described model evaluation unit with respect to the optimal thermal displacement amount prediction formula (thermal displacement model) calculated for each value for the second hyperparameter that was set or changed. As a result, based on a history for the stored value for the second hyperparameter and the evaluation value for the optimal thermal displacement amount prediction formula (thermal displacement model) calculated for each value for the second hyperparameter, in a case where the value for the first parameter is fixed to the optimal first hyperparameter value and the value for the second hyperparameter is set or changed, the information processing device can make a value for the second hyperparameter, for a time when the evaluation value is a minimum for the optimal thermal displacement amount prediction formula (thermal displacement model) calculated for each value for the second hyperparameter that was set or changed, be an optimal value for the second hyperparameter ("first-time optimal second hyperparameter value") when the value for the first parameter is the first-time optimal first hyperparameter value.

The process described above may be repeated again. Specifically, an optimal thermal displacement amount prediction formula (thermal displacement model) is calculated by setting the value for the second hyperparameter to the first-time optimal second hyperparameter value, re-setting/changing the value for the first hyperparameter, and for each value of the first hyperparameter that is set or changed, performing machine learning, for example as described above, on the coefficient pertaining to the time delay element and the coefficient pertaining to the measurement data in the thermal displacement amount prediction formula (thermal displacement model), while employing as teacher data a set of temperature data measured by the temperature sensors and measurement value data for an amount of thermal displacement at a time of temperature measurement.

The information processing device stores, in association with the value for the first hyperparameter, an evaluation value calculated by a later-described model evaluation unit with respect to the optimal thermal displacement amount prediction formula (thermal displacement model) calculated for each value for the first hyperparameter that was set or changed. As a result, based on a history for the stored value for the first hyperparameter and the evaluation value for the optimal thermal displacement amount prediction formula (thermal displacement model) calculated for each value for the first hyperparameter, in a case where is made to be the optimal second hyperparameter value calculated in the process described above, and the value for the first hyperparameter is set or changed, the information processing device can make a value for the first hyperparameter, for a time when the evaluation value is a minimum for the optimal thermal displacement amount prediction formula (thermal displacement model) calculated for each value for the first hyperparameter that was set or changed, be an optimal value for the first hyperparameter ("second-time optimal first hyperparameter value") when the value for the second hyperparameter is a fixed value.

In a case of repeating the previously-described process in this manner and a preset arbitrarily-defined condition (such as execution of the process a preset number of times or the evaluation value becoming a preset threshold or less, for example) is satisfied, it is possible to make an optimal hyperparameter value acquired at that time be an optimal value. As a result, it is possible to solve the problem of "automatically optimizing a hyperparameter value" according to the present embodiment.

The above is an outline of the present embodiment.

Next, using the drawings, description is given in detail regarding a configuration according to the present embodiment.

FIG. 1 is a functional block diagram illustrating an example of a functional configuration of an information processing system according to one embodiment. As illustrated in FIG. 1, the information processing system 1 has a machine tool 10, a control device 20, and an information processing device 30.

The machine tool 10, the control device 20, and the information processing device 30 may be directly connected to each other via a connection interface (not shown). Note that the machine tool 10, the control device 20, and the information processing device 30 may be connected to each other via a network such as a local area network (LAN). In this case, it may be that the machine tool 10, the control device 20, and the information processing device 30 are each provided with a communication unit (not shown) for communicating with each other via the corresponding connection.

Note that the information processing device 30 may be included in the control device 20, as described below. In addition, the control device 20 may be included in the machine tool 10, as described below.

The machine tool 10 is a machine tool that is publicly known to a person skilled in the art. For example, the machine tool 10, based on an operation command from the control device 20, uses a tool such as an edged tool attached to a main shaft included in the machine tool 10 to perform cutting, etc. on a workpiece disposed in the machine tool 10.

The control device 20 is a numerical control device which is publicly known to a person skilled in the art and sends a control signal to the machine tool 10 to thereby perform control such that the machine tool 10 performs predetermined machining such as cutting. A plurality of machining programs defined in accordance with machining content for a workpiece are stored in the control device 20. The control device 20 reads and interprets a machining program for performing predetermined machining, whereby conditions (for example, a frequency of acceleration/deceleration for the main shaft, a rotation number, a cutting load, or a cutting time period) for the predetermined machining are extracted and position command data, etc. is inputted to a thermal displacement compensation device 201. The control device 20 generates a control signal for the machine tool 10 based on position command data subjected to thermal displacement compensation using a thermal displacement amount prediction formula (thermal displacement model) generated by the later-described information processing device 30 and outputted from the thermal displacement compensation device 201, and sends the control signal to the machine tool 10 to thereby cause the machine tool 10 to perform predetermined machining.

Note that, for the thermal displacement compensation device 201, it is possible to use a thermal displacement compensation device such as in Patent Document 1, for example, and a detailed description thereof is omitted.

In addition, it may be that the control device 20 extracts a machining condition (for example, a frequency of acceleration/deceleration for the main shaft, a rotation number, a cutting load, or a cutting time period) and outputs the machining condition to the information processing device 30, which is described below. In addition, in relation to a rotation number, cutting time period, etc., it may be that the control device 20 outputs, to the information processing device 30, information acquired in real-time from, for example, a main-shaft motor (not shown) that drives the main shaft (not shown) included in the machine tool 10.

In addition, a plurality of terminals for connecting to a sensor that attaches to the machine tool 10 are present in the control device 20 in order to acquire measurement data (for example, temperature, displacement). By connecting or disconnecting sensor cables from these terminals, it is possible to add or remove sensors that are connected to the control device 20 and are installed in the machine tool 10. In addition, it is also possible to change the disposition of a sensor installed in the machine tool 10. Note that changing the disposition of a sensor can be handled as an aspect in which the sensor is removed from the installation location in the machine tool 10, and the sensor is added to a changed location for installation. As a result, it is possible to perform a setting change for the number of temperature sensors and the disposed positions for temperature sensors, which will be hyperparameters.

The control device 20 may output measurement data from a sensor to the information processing device 30.

<Information Processing Device 30>

The information processing device 30 is a computer device publicly known to a person skilled in the art, and has a control unit 310 and a storage unit 320 as illustrated in FIG. 1. In addition, the control unit 310 has a measurement data acquisition unit 311, a thermal displacement amount acquisition unit 312, a parameter selection method determination unit 313, a parameter selection unit 314, a machine learning unit 315, and a model evaluation unit 316. In addition, the storage unit 320 stores historical data 321 and measurement data 322.

<Storage Unit 320>

It may be that the storage unit 320 is a read-only memory (ROM), a hard disk drive (HDD), etc., and stores various control programs as well as the historical data 321 and the measurement data 322.

For example, in a course for an optimization process as described below, a validation error is calculated using an actual measurement value for an amount of thermal displacement acquired from the control device 20 and an amount of thermal displacement estimated using a thermal displacement amount prediction formula (thermal displacement model) generated for each value set to a hyperparameter to be optimized by inputting a measurement data group acquired from the control device 20 to the thermal displacement amount prediction formula (thermal displacement model). The historical data 321 stores this validation error as an evaluation value for the thermal displacement amount prediction formula (thermal displacement model), in association with the value set for this hyperparameter.

The measurement data 322 measured for each value set for the hyperparameter to be optimized stores a measurement data group acquired from the control device 20 by the later-described measurement data acquisition unit 311 as input data, and an actual measurement value that is for an amount of thermal displacement of a mechanical element and is acquired from the control device 20 by the later-described thermal displacement amount acquisition unit 312 as a label, which are associated with each other as teacher data for performing machine learning on an optimal thermal displacement amount prediction formula (thermal displacement model) for a value set to the hyperparameter.

<Control Unit 310>

The control unit 310 is something publicly known to a person skilled in the art that has a central processing unit (CPU), a ROM, a random-access memory (RAM), a complementary metal-oxide-semiconductor (CMOS) memory, etc., with each of these configured to be able to mutually communicate via a bus.

The CPU is a processor that comprehensively controls the information processing device 30. The CPU reads out, via the bus, a system program and an application program that are stored in the ROM, and controls the entirety of the information processing device 30 in accordance with the system program and the application program. As a result, the control unit 310 is configured to realize functionality for the measurement data acquisition unit 311, the thermal displacement amount acquisition unit 312, the parameter selection method determination unit 313, the parameter selection unit 314, the machine learning unit 315, and the model evaluation unit 316, as illustrated in FIG. 1. Various data such as temporary calculation data or display data is stored in the RAM. In addition, the CMOS memory is supported by a battery (not shown), and is configured as a non-volatile memory for which a storage state is maintained even if a power supply for the information processing device 30 is turned off.

The measurement data acquisition unit 311 acquires a measurement data group from the control device 20. Here, measurement data may include temperature data that is for a mechanical element in the machine tool 10 and the periphery of the mechanical element and is measured by a temperature sensor. Further, the measurement data may include operating state data regarding a mechanical element in the machine tool 10, specifically, for example, a physical property value regarding a location where a temperature sensor cannot be affixed, such as a rotation speed for the main shaft in the machine tool 10, a coolant flow rate with respect to the main shaft, or an amount of lubricating oil with respect to a main-shaft bearing.

The thermal displacement amount acquisition unit 312 acquires an actual measurement value that is for an amount of thermal displacement of a mechanical element in the machine tool 10 and is detected by a probe, for example.

The parameter selection method determination unit 313 selects at least one hyperparameter to be optimized from among a plurality of hyperparameters included in a thermal displacement amount prediction formula (thermal displacement model). Here, a thermal displacement amount prediction formula (thermal displacement model) according to the present embodiment is described by giving, as an example, a result of adding a time shift element for measurement data.

More specifically, because there is a plurality of independent variables in a measurement data group, for example, description is given by taking as an example a thermal displacement amount prediction formula (thermal displacement model) as a polynomial that is set based on multiple regression analysis of a generalized linear model, and has a time shift element for measurement data taken into account.

Note that a thermal displacement amount prediction formula (thermal displacement model) is not limited to this example. The invention according to the present application can be applied to an arbitrarily-defined thermal displacement amount prediction formula (thermal displacement model).

Letting an estimated value for the amount of thermal displacement at a time t be Y(t) and a measurement value from a temperature sensor $X_k$ at the time t be $X_k(t)$, a thermal displacement amount prediction formula (thermal displacement model) in which a time shift element for measurement data is used as a time delay element becomes the following formula 1. Here, $\Delta t_k$ is the sampling time for a measurement value from the temperature sensor $X_k$, and a coefficient $T_k$ is a delay portion coefficient for setting how far in the past to trace back. In addition, in a case where N is the number of all of the temperature sensors predisposed in the machine tool 10, n is the number (1≤n≤N) of temperature sensors of these that are used. Here, please note that n is a number that includes disposed positions for temperature sensors. In other words, different disposed positions for a total number $_NC_n$ of combinations resulting from selecting n temperature sensors from N different temperature sensors respectively correspond to n.

In this manner, the sampling time $\Delta t_k$, the coefficient $T_k$, and the number (including disposed positions) n of temperature sensors are hyperparameters in the thermal displacement amount prediction formula (thermal displacement model) in formula 1. By virtue of the present invention, it is possible to automatically calculate optimal hyperparameter values in the thermal displacement amount prediction formula (thermal displacement model) in formula 1.

$$Y(t) = \sum_{k=1}^{n} a_k \left( \sum_{\tau=0}^{T_k} b_{k\tau} X_k(t - \tau \Delta t_k) \right) \qquad \text{[Formula 1]}$$

Here, $a_0, a_1, \ldots, a_n$ are coefficients determined using multiple regression analysis, and $b_{k0}, b_{k1}, \ldots, b_{kTk}$ are coefficients corresponding to a delay portion.

As described above, the coefficient $T_k$ corresponding to a delay portion and the sampling time $\Delta t_k$ for a measurement value by the temperature sensor $X_k$ are hyperparameters (hereinafter, may be referred to as "time-delay hyperparameters") pertaining to a time delay element for measurement data. In other words, a reference interval for time delay measurement data and a number of items of time delay measurement data, which are referred to by the thermal displacement amount prediction formula (thermal displacement model) in formula 1, change in accordance with two time-delay hyperparameters. In other words, there is the meaning of how many items of data dating back in the past to look at for a time delay.

In contrast, it is envisioned that there is a plurality of temperature sensors $X_k$, but due to reasons such as (1) costs will rise when all temperature sensors $X_k$ are used and (2) a formula having many explanatory variables is prone to overlearning, not all of the temperature sensors $X_k$ are incorporated in the thermal displacement amount prediction formula (thermal displacement model) in formula 1. Accordingly, the parameter selection unit 314, which is described below, selects a combination from the plurality of temperature sensors $X_k$ to incorporate in the thermal displacement amount prediction formula (thermal displacement model) in formula 1. The number of temperature sensors $X_k$ employed in the combination is n. A hyperparameter for the number of temperature sensors n may be referred to below as a "temperature sensor combination hyperparameter".

It may be that the parameter selection method determination unit 313, for example, selects a time-delay hyperparameter as a first hyperparameter or selects a temperature sensor combination hyperparameter as a second hyperparameter, alternatingly as the first hyperparameter and the second hyperparameter which are to be optimized.

The parameter selection unit 314 sets/changes a value for one hyperparameter selected by the parameter selection method determination unit 313, and fixes the value of the other hyperparameter that was not selected by the parameter selection method determination unit 313.

Specifically, for example in a case where a time-delay hyperparameter which serves as the first hyperparameter is selected, the parameter selection unit 314 sets/changes, within a predefined search range, each of the sampling time $\Delta t_k$ for a measurement value by the temperature sensor $X_k$ and the coefficient $T_k$ corresponding to a delay portion, which are included in the time-delay hyperparameter. In contrast, the value for the temperature sensor combination hyperparameter which serves as the second hyperparameter is fixed. Specifically, it may be that, for example, as a value for the temperature sensor combination hyperparameter which serves as the second hyperparameter, the parameter selection unit 314 fixes a temperature sensor combination to a combination (for example, all temperature sensors) predefined as an initial value or, based on the historical data 321, to a combination for a time at which the previously-described evaluation value was a minimum.

As a result, it may be, for example, that a search in a range of 1 to 10 seconds is performed for the sampling time $\Delta t_k$ for a measurement value by the temperature sensor $X_k$ which serves as the first hyperparameter, and a search in a range of coefficients 1 to 10 is performed for the coefficient $T_k$ corresponding to the delay portion. Note that the search range is not limited to this, and may be determined, as appropriate, in response to, for example, a prediction accuracy for the thermal displacement amount prediction formula (thermal displacement model). For example, it may be that a search in a range such as 1 to 10 minutes or 1 to 10 hours, for example, is performed for the sampling time $\Delta t_k$ for a measurement value by the temperature sensor $X_k$.

Note that the parameter selection unit 314 may set/change, within the search range, a value for the time-delay hyperparameter which serves as the first hyperparameter, in a full search (grid search). Note that the parameter selection unit 314 may use a random search, Bayesian optimization, etc. to set/change, within the search range, a value for the time-delay hyperparameter which serves as the first hyperparameter. By using a random search, Bayesian optimization, etc., the information processing device 30 can address reducing computational cost. At this time, it is desirable to perform a convergence determination (convergence of model performance) in a determination for performing all combinations. However, in a case where performance is not satisfied, it may be performed again after widening the search range.

In contrast, in a case where a temperature sensor combination hyperparameter which serves as the second hyperparameter is selected, the parameter selection unit 314 sets/changes the value for the temperature sensor combination hyperparameter within the search range. In this case, the parameter selection unit 314 fixes the value for the time-delay hyperparameter which serves as the first hyperparameter. Specifically, it may be that, for example, the value for the time-delay hyperparameter which serves as the first hyperparameter is fixed to a value for when the previously-described evaluation value is a minimum, based on the historical data 321.

Here, regarding the temperature sensor combination hyperparameter which serves as the second hyperparameter, it may be that a range for combinations of temperature sensors $X_k$ is searched for each number of temperature sensors from 1 to N. Note that the search range is not limited to this, and may be determined, as appropriate, in response to, for example, a prediction accuracy for the thermal displacement amount prediction formula (thermal displacement model).

Note that the parameter selection unit 314 may set/change, within the search range, the value for the temperature sensor combination hyperparameter which serves as the second hyperparameter in a full search (grid search), or may use a random search, Bayesian optimization, etc. to set/change, within the search range, the value for the temperature sensor combination hyperparameter which serves as the second hyperparameter. By using a random search, Bayesian optimization, etc., the information processing device 30 can address reducing computational cost. At this time, it is desirable to perform a convergence determination (convergence of model performance) in a determination for performing all combinations. However, in a case where performance is not satisfied, it may be that, for example, a position where a temperature sensor $X_k$ is affixed is changed, it is performed again from data collection, etc.

For each combination of a value for the time-delay hyperparameter which serves as the first hyperparameter and a value for the temperature sensor combination hyperparameter which serves as the second hyperparameter, the machine learning unit 315 performs machine learning based on a measurement data group and an actual measurement value for an amount of thermal displacement of a mechanical element. For each value for the time-delay hyperparameter (first hyperparameter) or value for the temperature sensor combination hyperparameter (second hyperparameter), which are to be optimized and were set/changed, the machine learning unit 315 generates the thermal displacement amount prediction formula (thermal displacement model) in formula 1.

Specifically, the machine learning unit 315 uses the value for the time-delay hyperparameter (first hyperparameter) and the value for the temperature sensor combination hyperparameter (second hyperparameter), which were set by the parameter selection unit 314, to set the thermal displacement amount prediction formula (thermal displacement model) in formula 1. Based on a difference between an actual measurement value for an amount of thermal displacement of a mechanical element within a predetermined time period that was stored as a label in the measurement data 322 and an estimated value for an amount of thermal displacement of the mechanical element that was calculate by substituting, into the thermal displacement amount prediction formula (thermal displacement model), a measurement data group for within a predetermined time period that was stored as teacher data in the measurement data 322, the machine learning unit 315, for example, uses a least squares method, etc. to set the thermal displacement amount prediction formula (thermal displacement model) such that the difference becomes a minimum.

In other words, the machine learning unit 315 can use machine learning that uses the least squares method to infer and set a coefficient with which a squared error between the estimated value for the amount of thermal displacement, which is calculated using the thermal displacement amount prediction formula (thermal displacement model) in formula 1 using a time shift element for measurement data, and the actual measurement value for the amount of thermal displacement is a minimum.

More specifically, letting measurement data be $X_k$ and a label be $Y_L$, the machine learning unit 315 acquires a set for the coefficients $a_k$ and $b_{k\tau}$ such that a value resulting from summing $$(Y_L - Y(t))^2 = \left(Y_L - \sum_{k=1}^{n} a_k \left(\sum_{\tau=0}^{T_k} b_{k\tau} X_k(t - \tau \Delta t_k)\right)\right)^2 \quad \text{[Formula 2]}$$

over a plurality of items of teacher data becomes a minimum.

In other words, similarly to the case for Patent Document 1, regarding the coefficients $a_k$ and $b_{k\tau}$ in formula 2, it may be that the machine learning unit 315 determines $a_k$ and $b_{k\tau}$ by repeating a setting in accordance with machine learning for the parameters $b_{k0}, b_{k1}, \ldots, b_{kTk}$ which are related to time in a state where $a_k$ which is a parameter that is not related to time is fixed, and a setting in accordance with machine learning for the parameter $a_k$ that is not related to time in a state where the parameters $b_{k0}, b_{k1}, \ldots, b_{kTk}$ which are related to time are fixed.

The model evaluation unit 316 calculates, as an evaluation value, an error between an actual measurement value for an amount of thermal displacement of a mechanical element and an amount of thermal displacement that was estimated by inputting a measurement data group to the thermal displacement amount prediction formula (thermal displacement model) that was generated for each value for the time-delay hyperparameter (first hyperparameter) and value for the temperature sensor combination hyperparameter (second hyperparameter), which are to be optimized. The model evaluation unit 316 stores the calculated evaluation value in the historical data 321 in association with a value set for the time-delay hyperparameter or the temperature sensor combination hyperparameter, which are to be optimized. The parameter selection method determination unit 313 then employs, as an optimal value (or combination), the value for the time-delay hyperparameter or the temperature sensor combination hyperparameter, which are to be optimized, for a time when the evaluation value is a minimum, based on the historical data 321.

<Optimization Process by Information Processing Device 30>

Figure 2:
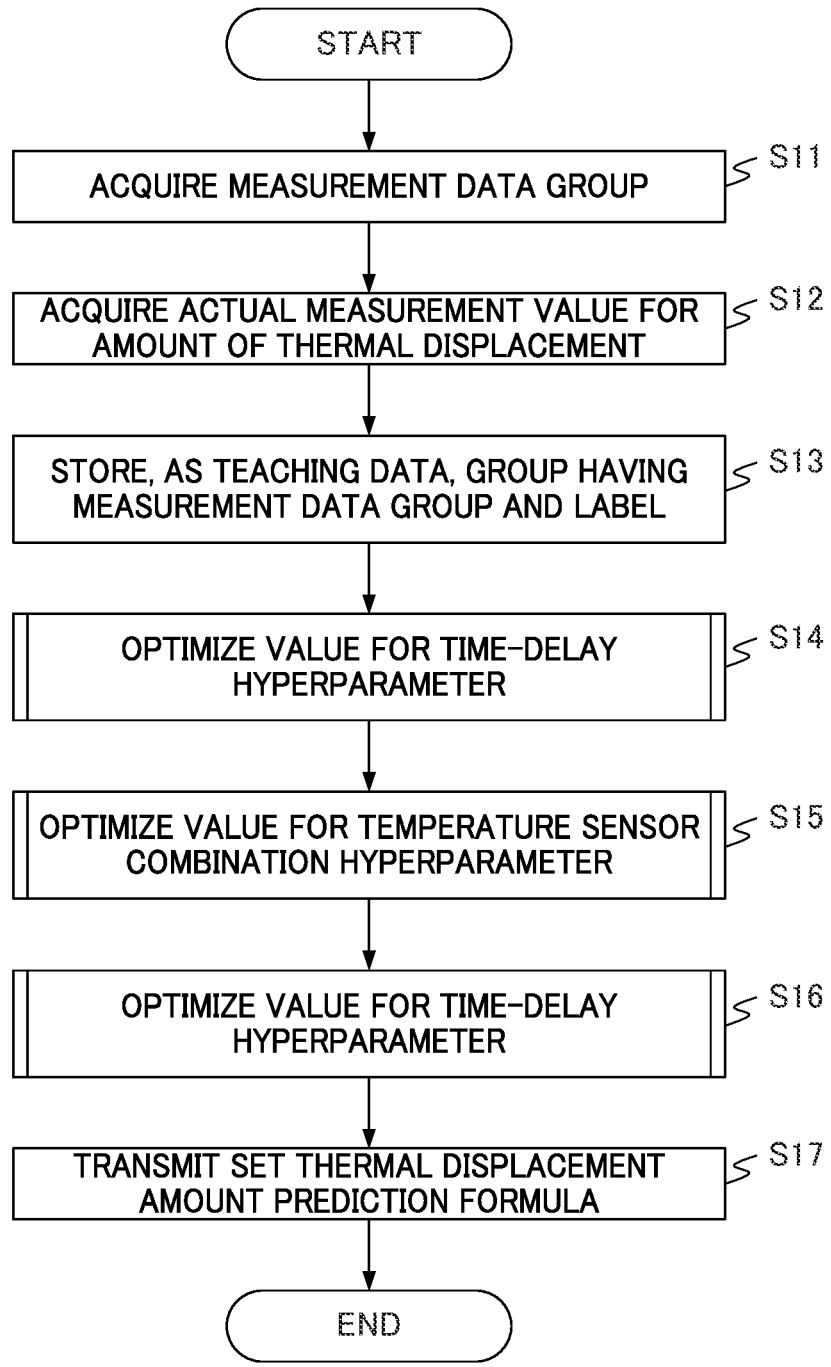
FIG. 2 is a flow chart for describing in relation to an optimization process pertaining to values for a first hyperparameter and a second hyperparameter in a thermal displacement amount prediction formula (thermal displacement model) in an information processing device.

Next, with reference to FIG. 2, description is given regarding a flow for an optimization process pertaining to values for a first hyperparameter and a second hyperparameter in a thermal displacement amount prediction formula (thermal displacement model) in the information processing device 30.

FIG. 2 is a flow chart for describing in relation to an optimization process pertaining to values for a first hyperparameter and a second hyperparameter in a thermal displacement amount prediction formula (thermal displacement model) in the information processing device 30.

Note that, in the flow illustrated here, firstly a value for the time-delay hyperparameter (first hyperparameter) is optimized, next a value for the temperature sensor combination hyperparameter (second hyperparameter) is optimized, and the value for the time-delay hyperparameter (first hyperparameter) is optimized again. However, an optimization process by the information processing device 30 is not limited to this. For example, the information processing device 30 may repeat an optimization process for a value for the time-delay hyperparameter (first hyperparameter) and an optimization process for a value for the temperature sensor combination hyperparameter (second hyperparameter) two times or more.

In Step S11, the measurement data acquisition unit 311 acquires a measurement data group from the control device 20. More specifically, the measurement data acquisition unit 311 acquires temperature data regarding a mechanical element in the machine tool 10 and the periphery of the mechanical element, and/or operating state data. It may be that the operating state data includes a rotation speed for the main shaft in the machine tool 10, a coolant flow rate, or a lubricating oil flow rate, for example.

Note that, for example, it may be that, as measurement data, data regarding an amount of temperature change is acquired instead of data regarding temperature itself. Furthermore, as data regarding an amount of temperature change, it may be that data regarding an amount of temperature change from an initial temperature is acquired, or it may be that data regarding an amount of temperature change from a previously measured temperature until a currently measured temperature is acquired. In addition, the operating state data may include an amount of heat absorbed by coolant and an amount of heat absorbed by lubricating oil.

In Step S12, the thermal displacement amount acquisition unit 312 acquires an actual measurement value that is for an amount of thermal displacement of a mechanical element in the machine tool 10 and is detected by a probe, for example. Specifically, for example, it may be that X, Y, and Z axis direction components for the amount of thermal displacement are measured, and a group of these measured values is employed as an actual measurement value.

In Step S13, the storage unit 320 sets the measurement data group acquired in Step S11 as input data, sets the actual measurement value for the amount of thermal displacement of the mechanical element acquired in Step S12 as a label, sets the input data and the label as a mutually associated group, and stores the group in the measurement data 322 as teacher data.

Note that the information processing device 30 can continuously acquire this teacher data online and then execute later-described machine learning. Alternatively, after acquiring all teacher data in advance as batch data, the later-described machine learning can be executed using this batch data. Alternatively, after separating this batch data into a plurality of small groups to make mini-batch data, this mini-batch data can also be used to execute the later-described machine learning.

In Step S14, the information processing device 30 selects the time-delay hyperparameter (first hyperparameter) as a hyperparameter to be optimized, and uses the teacher data acquired in Step S13 to execute optimization for a value for the time-delay hyperparameter (first hyperparameter). Details regarding processing in Step S14 are described below.

In Step S15, the information processing device 30 selects the temperature sensor combination hyperparameter (second hyperparameter) as a hyperparameter to be optimized, and executes optimization for a value for the temperature sensor combination hyperparameter (second hyperparameter) based on the teacher data acquired in Step S13 and a result of processing in Step S14. Details regarding processing in Step S15 are described below.

In Step S16, the information processing device 30 selects the time-delay hyperparameter (first hyperparameter) as a hyperparameter to be optimized, and executes optimization for a value for the time-delay hyperparameter (first hyperparameter) based on the teacher data acquired in Step S13 and a result of processing in Step S15. Processing in Step S16 is similar to the processing in Step S14, and details are described below.

In Step S17, the information processing device 30 transmits, to the thermal displacement compensation device 201 in the control device 20, a thermal displacement amount prediction formula (thermal displacement model) set in accordance with machine learning using the optimized value for the time-delay hyperparameter (first hyperparameter) and value for the temperature sensor combination hyperparameter (second hyperparameter).

Figure 3:
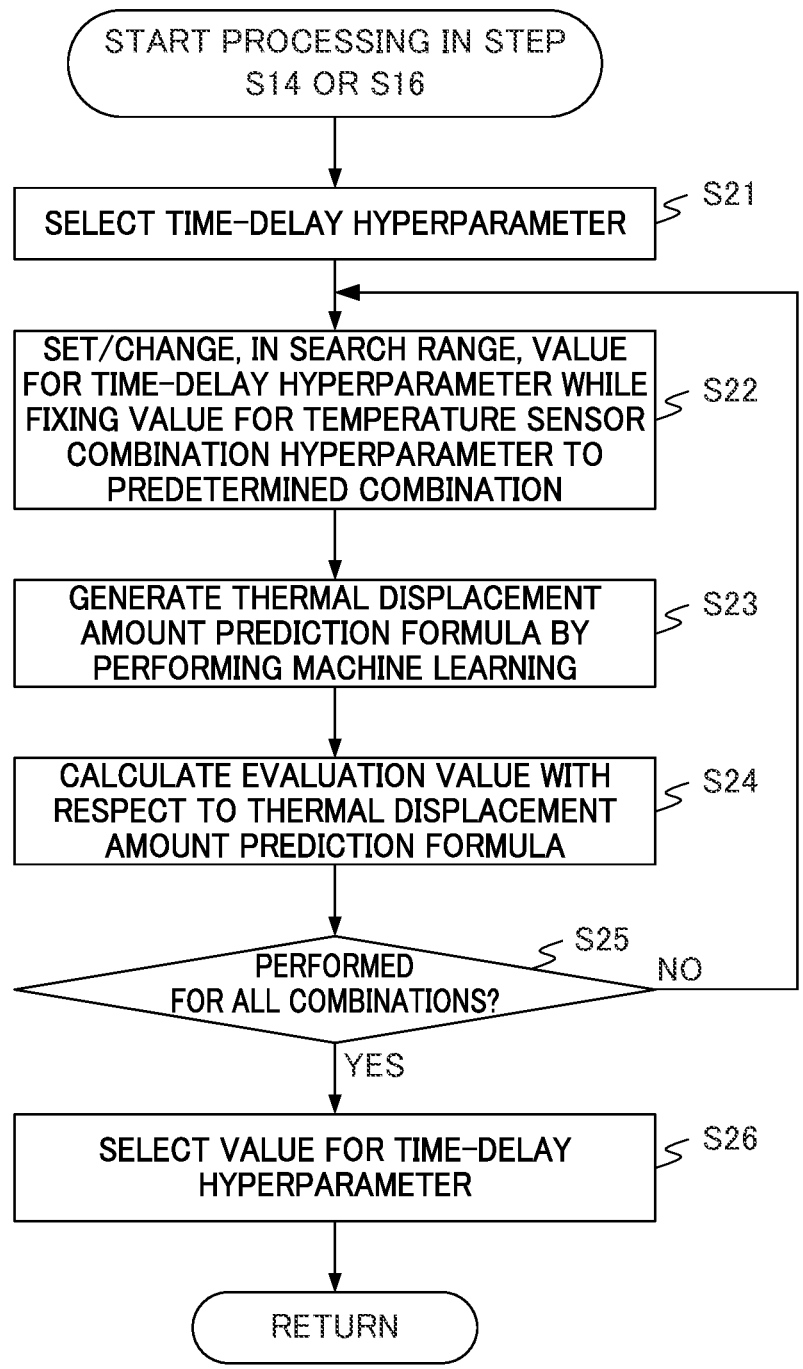
FIG. 3 is a flow chart for describing detailed processing content in the optimization process in Step S14 and Step S16 in FIG. 2.

FIG. 3 is a flow chart for describing detailed processing content in the optimization process in Step S14 and Step S16 in FIG. 2.

Figure 4:
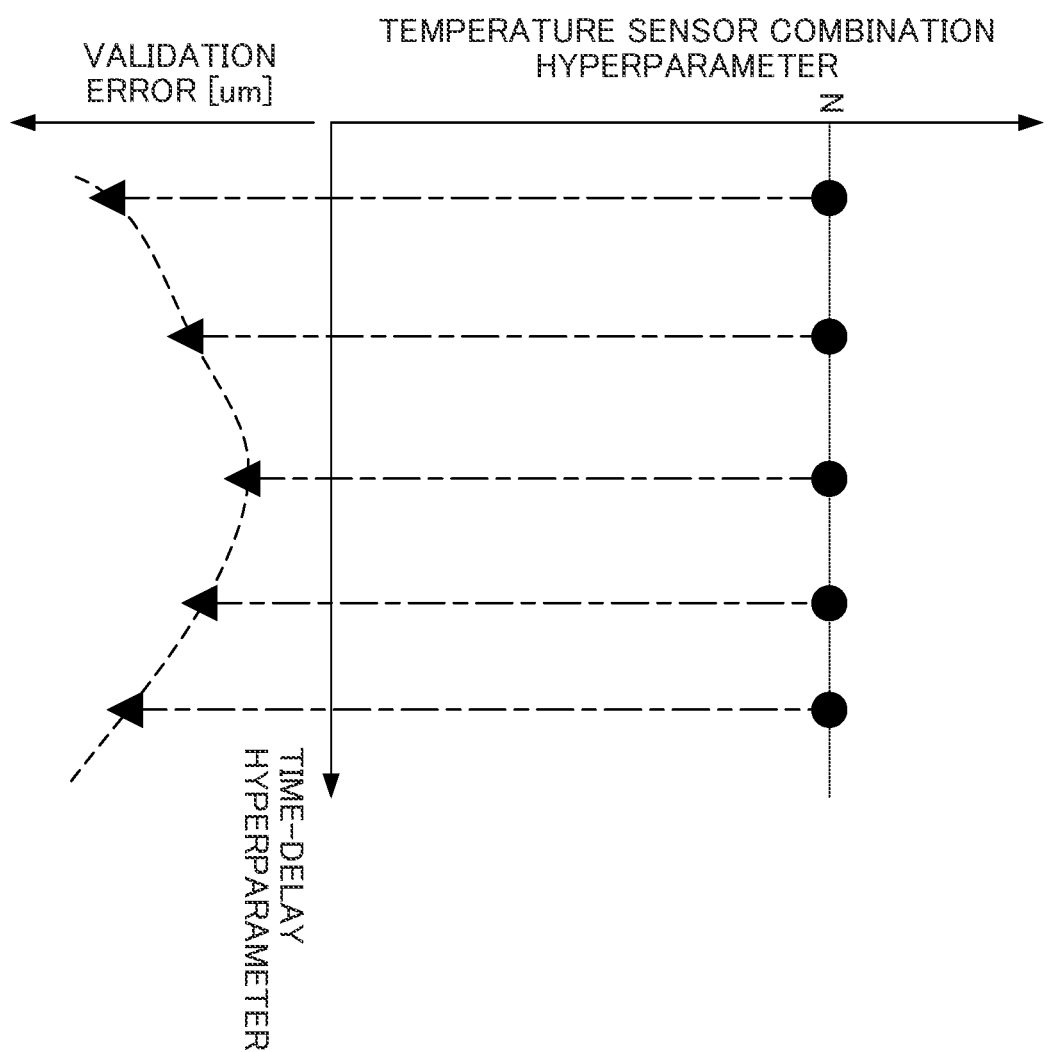
FIG. 4 is a view that illustrates an example of a description regarding the optimization process in Step S14.
Figure 5:
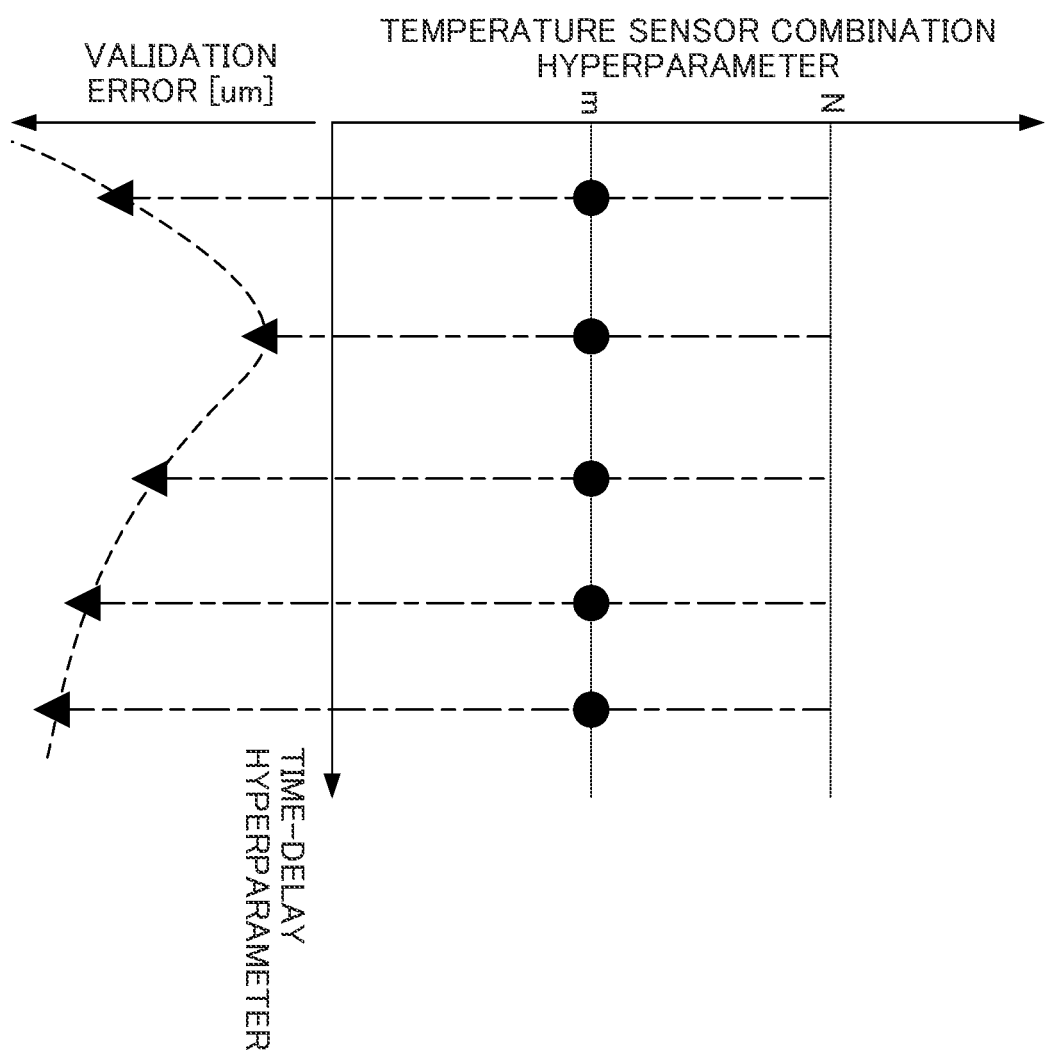
FIG. 5 is a view that illustrates an example of a description regarding the optimization process in Step S16.

FIG. 4 is a view that illustrates an example of a description regarding the optimization process in Step S14. FIG. 5 is a view that illustrates an example of a description regarding the optimization process in Step S16.

In the optimization process in Step S14, as illustrated in FIG. 4, the thermal displacement amount prediction formula (thermal displacement model) in formula 1 is generated for each value of the time-delay hyperparameter (first hyperparameter) while fixing the value for the temperature sensor combination hyperparameter (second hyperparameter) to a combination that uses all N temperature sensors, for example, and changing the value for the time-delay hyperparameter in order within the search range. In the optimization process in Step S14, an error between an amount of thermal displacement, which is estimated by inputting the measurement data group to the thermal displacement amount prediction formula (thermal displacement model) generated for each value for the time-delay hyperparameter (first hyperparameter), and an actual measurement value for an amount of thermal displacement of a mechanical element is calculated as an evaluation value (validation error), and a value for the time-delay hyperparameter (first hyperparameter) for which the evaluation value (validation error) is a minimum is selected as an optimal value.

In contrast, in the optimization process in Step S16, as illustrated in FIG. 5, the thermal displacement amount prediction formula (thermal displacement model) in formula 1 is generated for each value for the time-delay hyperparameter (first hyperparameter) while fixing the value for the temperature sensor combination hyperparameter (second hyperparameter) to the temperature sensor combination optimized in Step S15 (for example, a combination that uses m temperature sensors) and changing the value for the time-delay hyperparameter (first hyperparameter) in order within the search range. Note that m is an integer, with 1≤m≤N. In the optimization process in Step S16, similarly to in Step S14, an error between an amount of thermal displacement, which is estimated by inputting the measurement data group to the thermal displacement amount prediction formula (thermal displacement model) generated for each value for the time-delay hyperparameter (first hyperparameter), and an actual measurement value for an amount of thermal displacement of a mechanical element is calculated as an evaluation value (validation error), and a value for the time-delay hyperparameter (first hyperparameter) for which the evaluation value (validation error) is a minimum is selected as an optimal value.

In Step S21, the parameter selection method determination unit 313 selects the time-delay hyperparameter (first hyperparameter) as a hyperparameter to be optimized.

In Step S22, the parameter selection unit 314 uses a random search, Bayesian optimization, etc. to set/change, in a respective search range, the coefficient $T_k$ corresponding to a delay portion and a sampling time $\Delta t_k$ for a measurement value by a temperature sensor $X_k$ for the time-delay hyperparameter (first hyperparameter) selected in Step S21. In addition, the parameter selection unit 314 fixes a value for the temperature sensor combination (second hyperparameter) to a predetermined combination.

Note that, for example, the predetermined combination uses all of the N temperature sensors $X_k$ in a case for the optimization process in Step S14, and is selected in the processing in Step S15 in a case for the optimization process in Step S16.

In Step S23, the machine learning unit 315 generates the thermal displacement amount prediction formula (thermal displacement model) in formula 1 by performing machine learning based on the measurement data group, the actual measurement value for the amount of thermal displacement of the mechanical element, the value for the time-delay hyperparameter (first hyperparameter), and the value for the temperature sensor combination hyperparameter (second hyperparameter).

In Step S24, the model evaluation unit 316 calculates, as an evaluation value, an error between the amount of thermal displacement which was estimated by inputting the measurement data group to the thermal displacement amount prediction formula (thermal displacement model) generated in Step S23 and the actual measurement value for the amount of thermal displacement of the mechanical element. The model evaluation unit 316 stores the calculated evaluation value in the historical data 321 in association with the value set to the coefficient $T_k$ corresponding to the delay portion and the sampling time $\Delta t_k$ for the measurement value by the temperature sensor $X_k$, which are in the time-delay hyperparameter (first hyperparameter).

In Step S25, the parameter selection unit 314 determines, based on the historical data 321, whether it has been performed for all combinations in search ranges for a value for the sampling time $\Delta t_k$ for a measurement value by the temperature sensor $X_k$ and a value for the coefficient $T_k$ corresponding to a delay portion. In a case where it has been performed for all combinations, the process proceeds to Step S25. In contrast, in a case where it has not been performed for all combinations, the process returns to Step S22.

Note that the parameter selection unit 314 determined, based on the historical data 321, whether it was performed for all combinations in search ranges for a value for the sampling time $\Delta t_k$ for a measurement value by the temperature sensor $X_k$ and a value for the coefficient $T_k$ corresponding to a delay portion, but there is no limitation to this. For example, the parameter selection unit 314 may determine whether the evaluation value (validation error) calculated by the model evaluation unit 316 in Step S24 is less than or equal to a preset threshold or whether a number of repetitions has reached a preset predetermined number of times.

In Step S26, based on the historical data 321, the parameter selection method determination unit 313 selects, as optimal values, the value for the sampling time $\Delta t_k$ for the measurement value by the temperature sensor $X_k$ and the value for the coefficient $T_k$ corresponding to the delay portion, which are in the time-delay hyperparameter (first hyperparameter) for a time when the evaluation value is a minimum.

Figure 6:
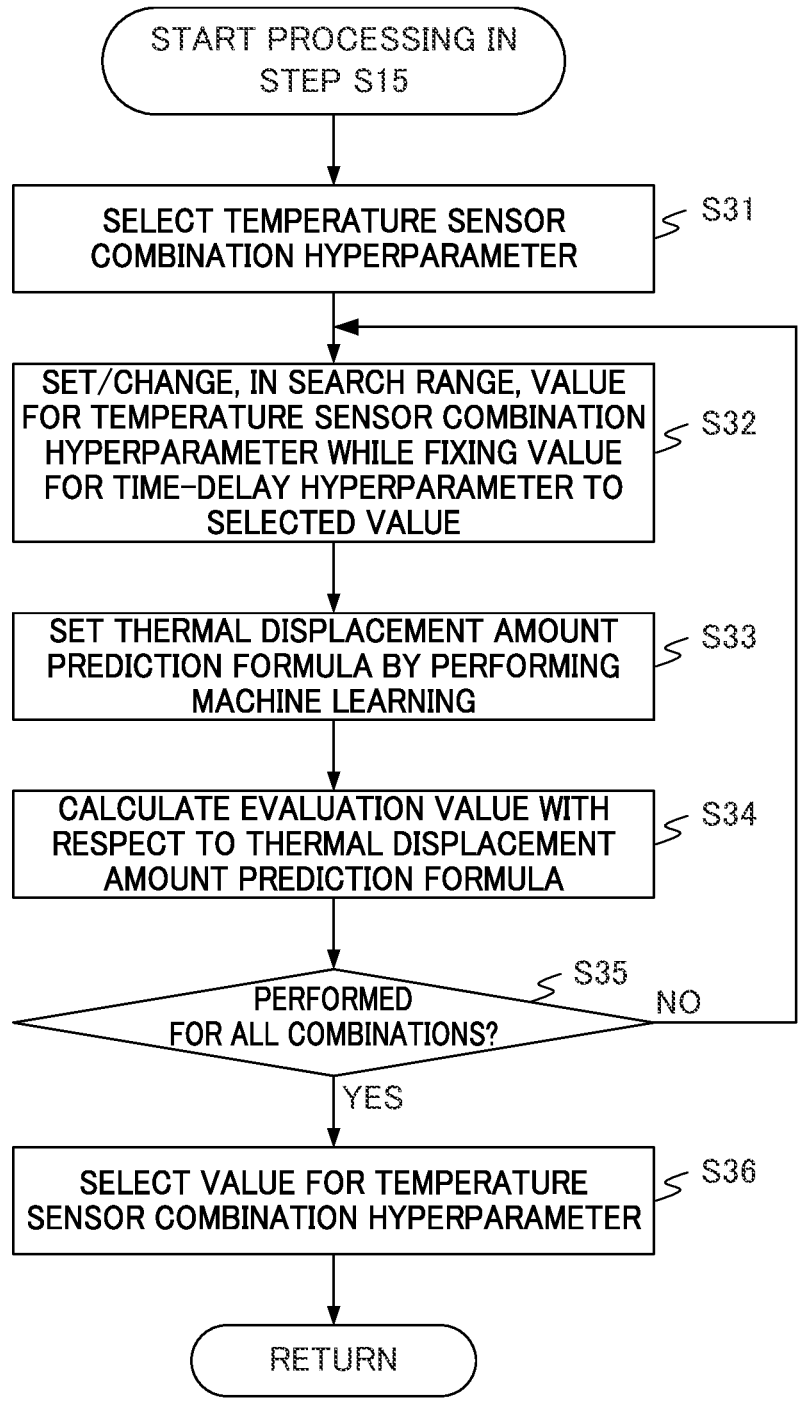
FIG. 6 is a flow chart for describing detailed processing content in the optimization process in Step S15 in FIG. 2.

FIG. 6 is a flow chart for describing detailed processing content in the optimization process in Step S15 in FIG. 2.

Figure 7:
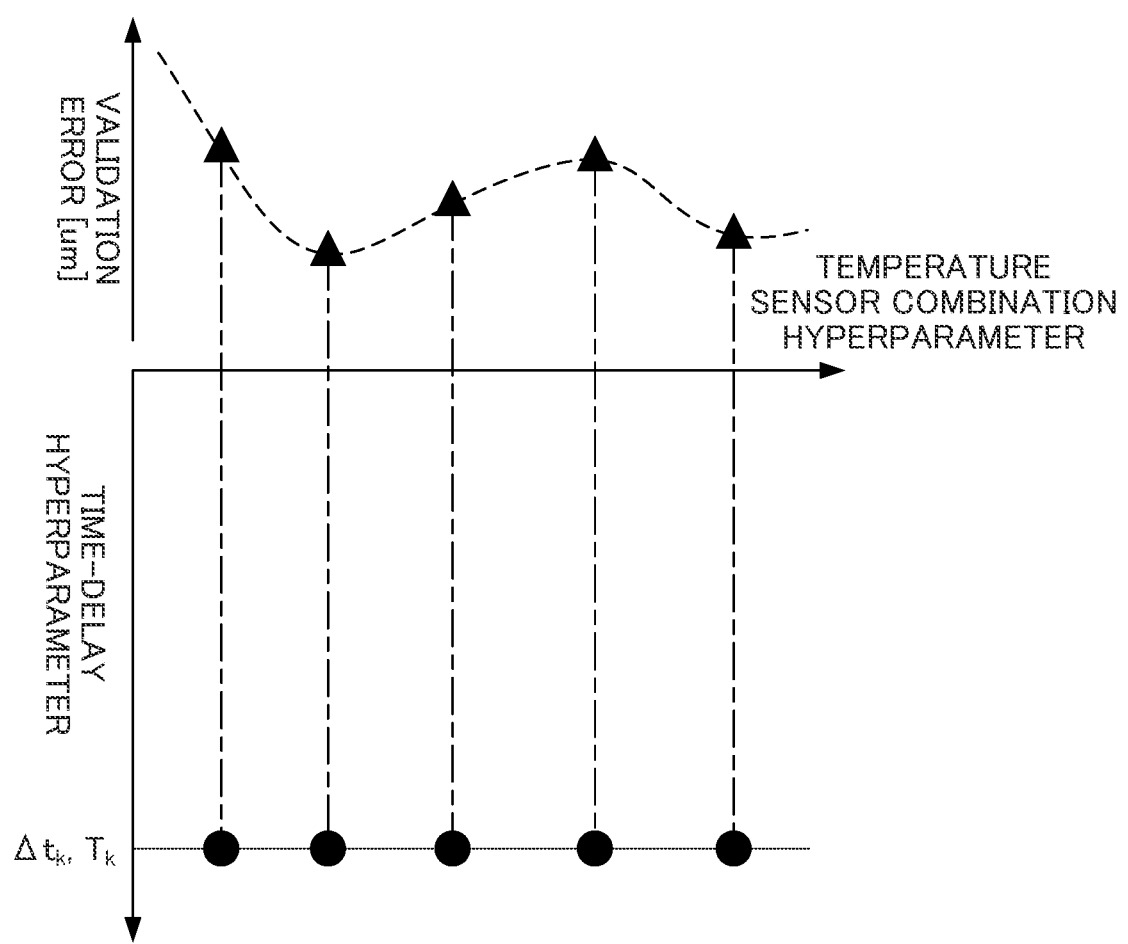
FIG. 7 is a view that illustrates an example of a description regarding the optimization process in Step S15.

FIG. 7 is a view that illustrates an example of a description regarding the optimization process in Step S15. As illustrated in FIG. 7, in the optimization process in Step S15, the thermal displacement amount prediction formula (thermal displacement model) in formula 1 is generated for each value of the temperature sensor combination hyperparameter (second hyperparameter) while fixing the value for the time-delay hyperparameter (first hyperparameter) to the value selected in Step S14 and changing the value for the temperature sensor combination hyperparameter (second hyperparameter) in order within the search range. In the optimization process in Step S15, an error between an amount of thermal displacement, which is estimated by inputting the measurement data group to the thermal displacement amount prediction formula (thermal displacement model) generated for each value for the temperature sensor combination hyperparameter (second hyperparameter), and an actual measurement value for an amount of thermal displacement of a mechanical element is calculated as an evaluation value (validation error), and a combination for the temperature sensor combination hyperparameter (second hyperparameter) for which the evaluation value (validation error) is a minimum is selected as an optimal combination.

Note that, in the following description, the value for the temperature sensor combination hyperparameter is optimized within a search range where the temperature sensor $X_k$ is a combination of 1 to N.

In Step S31, the parameter selection method determination unit 313 selects the temperature sensor combination hyperparameter (second hyperparameter) as a hyperparameter to be optimized.

In Step S32, the parameter selection unit 314 uses a random search, Bayesian optimization, etc. to set/change, within the search range, the value for the temperature sensor combination hyperparameter (second hyperparameter) that was selected in Step S31. In addition, the parameter selection unit 314 fixes the sampling time $\Delta t_k$ for a measurement value by the temperature sensor $X_k$ and the coefficient $T_k$ corresponding to a delay portion, which are in the time-delay hyperparameter (first hyperparameter), to values selected in Step S14.

In Step S33, the machine learning unit 315 performs similar processing to the Step S23 in FIG. 3, and generates the thermal displacement amount prediction formula (thermal displacement model) in formula 1 by performing machine learning based on the measurement data group, the actual measurement value for the amount of thermal displacement of the mechanical element, the value for the time-delay hyperparameter (first hyperparameter), and the value for the temperature sensor combination hyperparameter (second hyperparameter).

In Step S34, the model evaluation unit 316 calculates, as an evaluation value, an error between the amount of thermal displacement which was estimated by inputting the measurement data group to the thermal displacement amount prediction formula (thermal displacement model) generated in Step S33 and the actual measurement value for the amount of thermal displacement of the mechanical element. The model evaluation unit 316 stores the calculated evaluation value in the historical data 321 in association with the combination set to the temperature sensor combination hyperparameter (second hyperparameter).

In Step S35, the parameter selection unit 314 determines, based on the historical data 321, whether it has been performed for all combinations within the search range for temperature sensor combinations. In a case where it has been performed for all combinations, the process proceeds to Step S35. In contrast, in a case where it has not been performed for all combinations, the process returns to Step S32.

Note that the parameter selection unit 314 determines, based on the historical data 321, whether it has been performed for all combinations within the search range for temperature sensor combinations, but there is no limitation to this. For example, the parameter selection unit 314 may determine whether the evaluation value (validation error) calculated by the model evaluation unit 316 in Step S34 is less than or equal to a preset threshold or whether a number of repetitions has reached a preset predetermined number of times.

In Step S36, based on the historical data 321, the parameter selection method determination unit 313 selects, as an optimal value, the value for the temperature sensor combination hyperparameter (second hyperparameter) for a time at which the evaluation value is a minimum.

As above, the information processing device 30 according to one embodiment selects one of a time-delay hyperparameter (first hyperparameter) and a temperature sensor combination hyperparameter (second hyperparameter), which are included in a thermal displacement amount prediction formula (thermal displacement model). The information processing device 30 repeats optimization of, in a case where the time-delay hyperparameter (first hyperparameter) is selected, a value for the selected time-delay hyperparameter (first hyperparameter) in a state where the value for the temperature sensor combination hyperparameter (second hyperparameter) is fixed and optimization of, in a case where the temperature sensor combination hyperparameter (second hyperparameter) is selected, a value for the selected temperature sensor combination hyperparameter (second hyperparameter) in a state where the value for the time-delay hyperparameter (first hyperparameter) is fixed, to thereby determine the value for the time-delay hyperparameter (first hyperparameter) and the value for the temperature sensor combination hyperparameter (second hyperparameter).

As a result, the information processing device 30 can automatically optimize values for hyperparameters in a thermal displacement amount prediction formula (thermal displacement model).

In an optimization process for a value for the selected time-delay hyperparameter (first hyperparameter) or temperature sensor combination hyperparameter (second hyperparameter), the information processing device 30 uses a random search, Bayesian optimization, etc. to set/change the value for the selected time-delay hyperparameter (first hyperparameter) or temperature sensor combination hyperparameter (second hyperparameter) within a search range. As a result, the information processing device 30 can address reducing computational cost.

This concludes the description above regarding one embodiment, but the information processing device 30 is not limited to the embodiment described above, and include variations, improvements, etc. in a scope that enables an objective to be achieved.

<First Variation>

In the embodiment described above, the information processing device 30 is exemplified as a device that differs to the machine tool 10 or the control device 20, but some or all of the functionality of the information processing device 30 may be provided in the machine tool 10 or the control device 20.

Alternatively, some or all of the measurement data acquisition unit 311, the thermal displacement amount acquisition unit 312, the parameter selection method determination unit 313, the parameter selection unit 314, the machine learning unit 315, and the model evaluation unit 316 in the information processing device 30 may be provided in a server, for example. In addition, each function of the information processing device 30 may be realized using, for example, a cloud-based virtual server function.

Furthermore, the information processing device 30 may be a distributed processing system in which each function of the information processing device 30 is distributed among a plurality of servers, as appropriate.

<Second Variation>

As another example, in the embodiment described above, the information processing device 30, based on multiple regression analysis for a generalized linear model, uses the thermal displacement amount prediction formula (thermal displacement model) in formula 1 which uses a time shift element in measurement data, but there is no limitation to this. For example, the information processing device 30 may use a thermal displacement amount prediction formula (thermal displacement model) having a first-order delay element in measurement data.

$$Y(t) = \sum_{k=1}^{n} a_k \left( \sum_{\tau=0}^{T_k} X_k(t - \tau \Delta t_k) e^{-b_k \tau \Delta t_k} \right) \quad \text{[Formula 3]}$$

In addition, the information processing device 30 may use something based on multiple regression analysis of a non-linear model.

<Third Variation>

As another example, in the embodiment described above, the information processing device 30 optimized the value for the time-delay hyperparameter in Step S14, next optimized the value for the temperature sensor combination hyperparameter in Step S15, and optimized the value for the time-delay hyperparameter again in Step S16, but there is no limitation to this. For example, the information processing device 30 may repeat, for a predetermined number of times that is two or more, the optimization process for the temperature sensor combination hyperparameter in Step S15 and the optimization process for the time-delay hyperparameter in Step S16.

As a result, the information processing device 30 can set more optimized values for the time-delay hyperparameter and the temperature sensor combination hyperparameter.

<Fourth Variation>

As another example, in the embodiment described above, the thermal displacement amount prediction formula (thermal displacement model) has two types—a time-delay hyperparameter (first hyperparameter) and a temperature sensor combination hyperparameter (second hyperparameter)—but there is no limitation to this. For example, the information processing device 30 may use a thermal displacement amount prediction formula (thermal displacement model) that has three or more types of hyperparameters.

For example, in a case where the thermal displacement amount prediction formula (thermal displacement model) has four types of hyperparameters, the information processing device 30 selects a first type of hyperparameter and optimizes a value for the first type of hyperparameter in a state where values for the other three types of hyperparameters are fixed. Next, the information processing device 30 selects a second type of hyperparameter and optimizes a value for the second type of hyperparameter in a state where values for the other three types of hyperparameters are fixed. Next, the information processing device 30 selects a third type of hyperparameter and optimizes a value for the third type of hyperparameter in a state where values for the other three types of hyperparameters are fixed. Finally, the information processing device 30 selects a fourth type of hyperparameter and optimizes a value for the fourth type of hyperparameter in a state where values for the other three types of hyperparameters are fixed. The information processing device 30 may repeat these four optimization processes.

Note that, for example in the optimization process for the value for the first type of hyperparameter, in a case such as where a search result has not converged or did converge but an effect was low in comparison to optimization of values for other types of hyperparameters (for example, the evaluation value (validation error) was high), the information processing device 30 may flexibly change an order for optimization processes based on a processing result.

FIG. 8 is a view that illustrates an example of orders for optimization processes for values for four types of hyperparameters. The upper part in FIG. 8 illustrates a case in which optimization processes for values for the four types of hyperparameters are repeated in order from an optimization process for the value of the first type of hyperparameter. In contrast, for example, the lower part in FIG. 8 illustrates an order for optimization processes in a case where a priority for the second optimization process for the value for the first type of hyperparameter is lowered due to the first optimization process for the value for the first type of hyperparameter not converging. In other words, in the lower part in FIG. 8, due to the priority for the first optimization process for the value of the first type of hyperparameter having been lowered, the information processing device 30 performs the second optimization processes after the first optimization processes starting from the optimization process for the value for the second type of hyperparameter.

As a result, the information processing device 30 can optimize an adjustment schedule which is an order for the optimization processes for respective types of hyperparameter values, and can address shortening an amount of processing time and improving processing results (in other words, a better thermal displacement amount prediction formula (thermal displacement model) can be acquired).

<Fifth Variation>

As another example, in the embodiment described above, the information processing device 30 generated the thermal displacement amount prediction formula (thermal displacement model) in formula 1 by performing machine learning based on a measurement data group, an actual measurement value for the amount of thermal displacement of a mechanical element, a value for the time-delay hyperparameter (first hyperparameter), and a value for the temperature sensor combination hyperparameter (second hyperparameter), but there is no limitation to this. For example, the information processing device 30 may use a measurement data group and an actual measurement value for an amount of thermal displacement of a mechanical element to generate the thermal displacement amount prediction formula (thermal displacement model) in formula 1 by a publicly known cross-validation method.

<Sixth Variation>

As another example, the machine tool 10 was given as a cutting machine in the embodiment described above, but there is no limitation to this. The machine tool 10 may be a wire electrical discharge machine or a laser machining machine, for example.

Note that each function included in the information processing device 30 according to the one embodiment may each be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a floppy disk, magnetic tape, or a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a RAM). In addition, a program may be supplied to a computer by various types of transitory computer-readable mediums. An example of a transitory computer-readable medium includes an electrical signal, an optical signal, or electromagnetic waves. A transitory computer-readable medium can supply a program to a computer via wired communication channel such as an electrical wire or an optical fiber, or via a wireless communication channel.

Note that steps that express a program recorded to a recording medium of course include processing in chronological order following the order of these steps, but also include processing that is executed in parallel or individually, with no necessity for processing to be performed in chronological order.

To rephrase, the information processing device, control device, and optimization method according to the present disclosure can have various embodiments which have configurations such as the following.

(1) The information processing device 30 according to the present disclosure is an information processing device that, when generating a thermal displacement amount prediction formula by performing machine learning for, based on a measurement data group including temperature data regarding a mechanical element that undergoes thermal expansion and is in the machine tool 10 and regarding a periphery of the mechanical element and/or operating state data regarding the mechanical element, estimating an amount of thermal displacement of the mechanical element, optimizes values for a plurality of hyperparameters included in the thermal displacement amount prediction formula, the information processing device 30 including: the measurement data acquisition unit 311 that acquires the measurement data group; the thermal displacement amount acquisition unit 312 that acquires an actual measurement value for an amount of thermal displacement of the mechanical element; the storage unit 320 that sets the measurement data group acquired by the measurement data acquisition unit 311 as input data, sets the actual measurement value for the amount of thermal displacement of the mechanical element acquired by the thermal displacement amount acquisition unit 312 as a label, and stores the input data and the label associated with each other as teacher data; the parameter selection method determination unit 313 that selects, as a first hyperparameter, at least one hyperparameter to be optimized from among the plurality of hyperparameters; the parameter selection unit 314 that sets/changes a value for the first hyperparameter, sets a hyperparameter that was not selected by the parameter selection method determination unit 313 as a second hyperparameter, and fixes a value for the second hyperparameter; the machine learning unit 315 that, by performing machine learning based on the measurement data group and the actual measurement value for the amount of thermal displacement of the mechanical element for each combination of the value for the first hyperparameter and the value for the second hyperparameter, generates the thermal displacement amount prediction formula for each set/changed value for the first hyperparameter while setting the value for the second hyperparameter to a fixed value; and the model evaluation unit 316 that calculates, as an evaluation value, an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and stores the calculated evaluation value in the storage unit 320 in association with the value for the first hyperparameter while setting the value for the second hyperparameter to the fixed value, in which the parameter selection method determination unit 313, based on a history for the value for the first hyperparameter and the evaluation value that are stored in the storage unit 320, sets the value for the first hyperparameter at a time when the evaluation value is a minimum to an optimal value while setting the value for the second hyperparameter to the fixed value.

By virtue of this information processing device 30, it is possible to automatically optimize values for hyperparameters in a thermal displacement amount prediction formula (thermal displacement model).

(2) In the information processing device 30 according to (1), the parameter selection method determination unit 313, after having optimized the value for the first hyperparameter while setting the value for the second hyperparameter to the fixed value, may select, as the first hyperparameter, at least one different hyperparameter from among the plurality of hyperparameters.

As a result, the information processing device 30 can optimize values for all hyperparameters.

(3) In the information processing device 30 according to (1) or (2), the parameter selection unit 314 may set/change the value for the first hyperparameter based on a predefined search range.

As a result, the information processing device 30 can promptly acquire an optimal hyperparameter value.

(4) In the information processing device 30 according to any one of (1) to (3), the parameter selection unit 314 may set/change the value for the first hyperparameter using a random search or a Bayesian optimization.

As a result, the information processing device 30 can more efficiently acquire an optimal hyperparameter value.

(5) The control device 20 according to the present disclosure is provided with the information processing device 30 according to one of (1) to (4).

By virtue of this control device 20, a similar effect to that for (1) to (4) can be achieved.

(6) An optimization method according to the present disclosure is realized by a computer and is for, when generating a thermal displacement amount prediction formula by performing machine learning for, based on a measurement data group including temperature data regarding a mechanical element that undergoes thermal expansion and is in the machine tool 10 and regarding a periphery of the mechanical element and/or operating state data regarding the mechanical element, estimating an amount of thermal displacement of the mechanical element, optimizing values for a plurality of hyperparameters included in the thermal displacement amount prediction formula, the optimization method including: a measurement data acquisition step for acquiring the measurement data group; a thermal displacement amount acquisition step for acquiring an actual measurement value for an amount of thermal displacement of the mechanical element; a storage step for setting the measurement data group acquired in the measurement data acquisition step as input data, setting the actual measurement value for the amount of thermal displacement of the mechanical element acquired in the thermal displacement amount acquisition step as a label, and storing the input data and the label associated with each other as teacher data in the storage unit 320; a parameter selection method determination step for selecting, as a first hyperparameter, at least one hyperparameter to be optimized from among the plurality of hyperparameters; a parameter selection step for setting/changing a value for the first hyperparameter, setting a hyperparameter that was not selected in the parameter selection method determination step as a second hyperparameter, and fixing a value for the second hyperparameter; a machine learning step for, by performing machine learning based on the measurement data group and the actual measurement value for the amount of thermal displacement of the mechanical element for each combination of the value for the first hyperparameter and the value for the second hyperparameter, generating the thermal displacement amount prediction formula for each set/changed value for the first hyperparameter while setting the value for the second hyperparameter to a fixed value; and a model evaluation step for calculating an evaluation value that indicates an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and storing the calculated evaluation value in the storage unit 320 in association with the value for the first hyperparameter while setting the value for the second hyperparameter to the fixed value, in which, in the parameter selection method determination step, based on a history for the value for the first hyperparameter and the evaluation value that are stored in the storage unit 320, the value for the first hyperparameter at a time when the evaluation value is a minimum is set to an optimal value while the value for the second hyperparameter is set to the fixed value.

By virtue of this optimization method, a similar effect to that for (1) can be achieved.

EXPLANATION OF REFERENCE NUMERALS

1 Information processing system
10 Machine tool
20 Control device
30 Information processing device
310 Control unit
311 Measurement data acquisition unit
312 Thermal displacement amount acquisition unit
313 Parameter selection method determination unit
314 Parameter selection unit
315 Machine learning unit
316 Model evaluation unit
320 Storage unit
321 Historical data
322 Measurement data

The invention claimed is:

1. An information processing device configured to, when generating a thermal displacement amount prediction formula by performing machine learning for, based on a measurement data group including temperature data regarding a mechanical element that undergoes thermal expansion and is in a machine tool and regarding a periphery of the mechanical element and/or operating state data regarding the mechanical element, estimating an amount of thermal displacement of the mechanical element, optimize values for a plurality of hyperparameters included in the thermal displacement amount prediction formula, the information processing device comprising:
  a measurement data acquisition unit configured to acquire the measurement data group;
  a thermal displacement amount acquisition unit configured to acquire an actual measurement value for an amount of thermal displacement of the mechanical element;
  a storage unit configured to set the measurement data group acquired by the measurement data acquisition unit as input data, set the actual measurement value for the amount of thermal displacement of the mechanical element acquired by the thermal displacement amount acquisition unit as a label, and store the input data and the label associated with each other as teacher data;
  a parameter selection method determination unit configured to select, as a first hyperparameter, at least one hyperparameter to be optimized from among the plurality of hyperparameters;
  a parameter selection unit configured to set/change a value for the first hyperparameter, set a hyperparameter that was not selected by the parameter selection method determination unit as a second hyperparameter, and fix a value for the second hyperparameter;
  a machine learning unit configured to, by performing machine learning based on the measurement data group and the actual measurement value for the amount of thermal displacement of the mechanical element for each combination of the value for the first hyperparameter and the value for the second hyperparameter, generate the thermal displacement amount prediction formula for each set/changed value for the first hyperparameter while setting the value for the second hyperparameter to a fixed value; and
  a model evaluation unit configured to calculate, as an evaluation value, an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and store the calculated evaluation value in the storage unit in association with the value for the first hyperparameter while setting the value for the second hyperparameter to the fixed value,
  wherein the parameter selection method determination unit, based on a history for the value for the first hyperparameter and the evaluation value that are stored in the storage unit, sets the value for the first hyperparameter at a time when the evaluation value is a minimum to an optimal value while setting the value for the second hyperparameter to the fixed value.

2. The information processing device according to claim 1, wherein the parameter selection method determination unit, after having optimized the value for the first hyperparameter while setting the value for the second hyperparameter to the fixed value, selects, as the first hyperparameter, at least one different hyperparameter from among the plurality of hyperparameters.

3. The information processing device according to claim 1, wherein the parameter selection unit sets/changes the value for the first hyperparameter based on a predefined search range.

4. The information processing device according to claim 1, wherein the parameter selection unit sets/changes the value for the first hyperparameter using a random search or a Bayesian optimization.

5. A control device comprising: the information processing device according to claim 1.

6. An optimization method realized by a computer and for, when generating a thermal displacement amount prediction formula by performing machine learning for, based on a measurement data group including temperature data regarding a mechanical element that undergoes thermal expansion and is in a machine tool and regarding a periphery of the mechanical element and/or operating state data regarding the mechanical element, estimating an amount of thermal displacement of the mechanical element, optimizing values for a plurality of hyperparameters included in the thermal displacement amount prediction formula, the optimization method comprising:

a measurement data acquisition step for acquiring the measurement data group;

a thermal displacement amount acquisition step for acquiring an actual measurement value for an amount of thermal displacement of the mechanical element;

a storage step for setting the measurement data group acquired in the measurement data acquisition step as input data, setting the actual measurement value for the amount of thermal displacement of the mechanical element acquired in the thermal displacement amount acquisition step as a label, and storing the input data and the label associated with each other as teacher data in a storage unit;

a parameter selection method determination step for selecting, as a first hyperparameter, at least one hyperparameter to be optimized from among the plurality of hyperparameters;

a parameter selection step for setting/changing a value for the first hyperparameter, setting a hyperparameter that was not selected in the parameter selection method determination step as a second hyperparameter, and fixing a value for the second hyperparameter;

a machine learning step for, by performing machine learning based on the measurement data group and the actual measurement value for the amount of thermal displacement of the mechanical element for each combination of the value for the first hyperparameter and the value for the second hyperparameter, generating the thermal displacement amount prediction formula for each set/changed value for the first hyperparameter while setting the value for the second hyperparameter to a fixed value; and a model evaluation step for calculating an evaluation value that indicates an error between the actual measurement value for the amount of thermal displacement of the mechanical element and an amount of thermal displacement estimated by inputting the measurement data group to the thermal displacement amount prediction formula for each value for the first hyperparameter while setting the value for the second hyperparameter to the fixed value, and storing the calculated evaluation value in the storage unit in association with the value for the first hyperparameter while setting the value for the second hyperparameter to the fixed value, wherein, in the parameter selection method determination step, based on a history for the value for the first hyperparameter and the evaluation value that are stored in the storage unit, the value for the first hyperparameter at a time when the evaluation value is a minimum is set to an optimal value while the value for the second hyperparameter is set to the fixed value.

* * * * *